United States Patent
Deck

(12) United States Patent (10) Patent No.: US 7,483,135 B2
Deck (45) Date of Patent: Jan. 27, 2009

(54) CONFOCAL SPECTROMETER WITH ASTIGMATIC APERTURING

(75) Inventor: Francis J. Deck, Madison, WI (US)

(73) Assignee: Thermo Electron Scientific Instruments, LLC, Madison, WI (US)

( * ) Notice: Subject to any disclaimer, the term of this patent is extended or adjusted under 35 U.S.C. 154(b) by 241 days.

(21) Appl. No.: 11/486,882

(22) Filed: Jul. 14, 2006

(65) Prior Publication Data

US 2008/0013086 A1 Jan. 17, 2008

(51) Int. Cl.
*G01J 3/28* (2006.01)

(52) U.S. Cl. .................. 356/329; 356/331; 356/328; 356/326

(58) Field of Classification Search .......... 356/326–334
See application file for complete search history.

(56) References Cited

U.S. PATENT DOCUMENTS

| 4,618,260 | A | * | 10/1986 | Okubo ................... 356/331 |
| 4,690,559 | A | * | 9/1987 | Florek et al. ............ 356/328 |
| 4,856,898 | A | * | 8/1989 | Becker-Ross et al. ...... 356/328 |
| 5,002,393 | A | * | 3/1991 | Thevenon et al. ......... 356/333 |
| 5,189,486 | A | * | 2/1993 | Florek et al. ............ 356/328 |
| 5,661,589 | A | * | 8/1997 | Meyer .................... 359/232 |
| 5,751,588 | A | * | 5/1998 | Freedenberg et al. ...... 700/186 |
| 6,128,077 | A |   | 10/2000 | Jovin et al. |
| 7,133,131 | B2 | * | 11/2006 | Grey et al. ............. 356/331 |

* cited by examiner

*Primary Examiner*—L. G. Lauchman
(74) *Attorney, Agent, or Firm*—DeWitt Ross & Stevens; Michael C. Staggs

(57) ABSTRACT

A confocal spectrometer provides astigmatic optics which supply a monochromator or spectrograph with the image of a sample, with the astigmatic optics thereby providing separate first and second (tangential and sagittal) focal planes for the image. The monochromator/spectrograph has an entrance slit oriented along one of the focal planes, and this slit defines the spectral resolution of the monochromator/spectrograph and the field of view of the sample in one direction (in one focal plane). A supplemental slit is situated outside the monochromator/spectrograph adjacent the entrance slit, with the supplemental slit being oriented along the other focal plane. The supplemental slit therefore defines the field of view of the sample in a perpendicular direction (in the other focal plane). By varying the width of the supplemental and/or entrance slits, one may easily achieve the desired field of view.

8 Claims, 2 Drawing Sheets

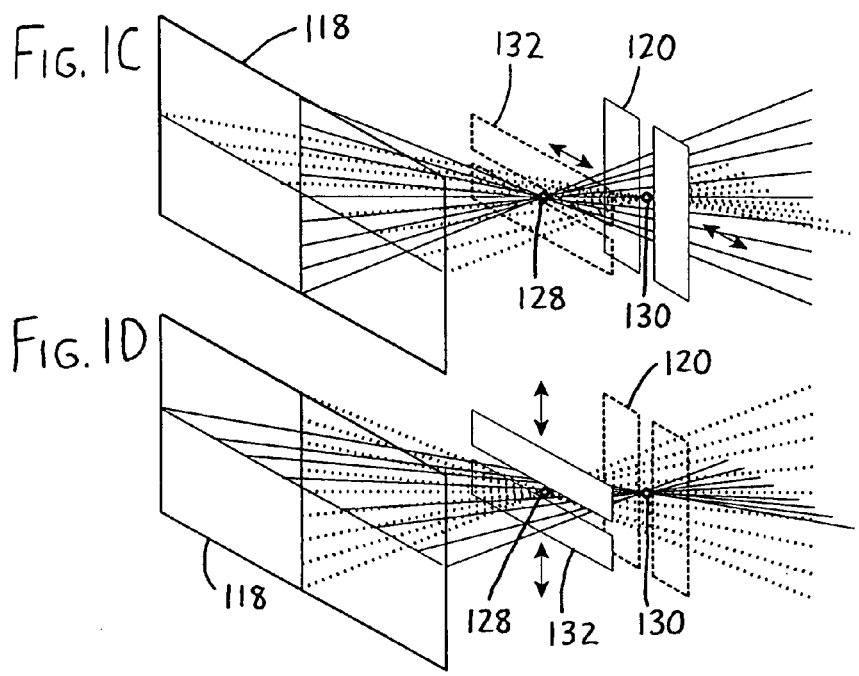
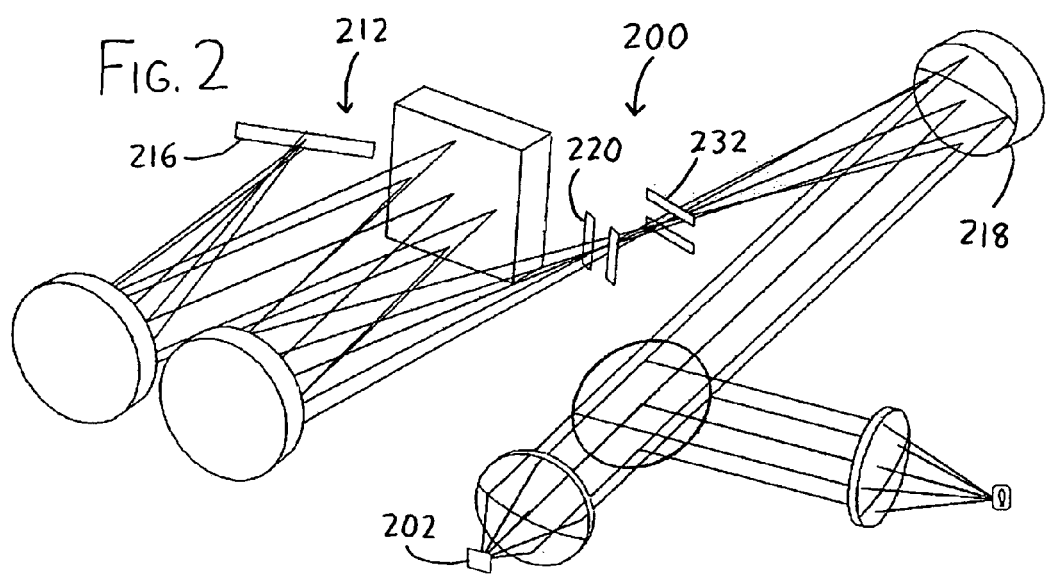

CONFOCAL SPECTROMETER WITH ASTIGMATIC APERTURING

FIELD OF THE INVENTION

This document concerns an invention relating generally to molecular spectrometry, and more specifically to arrangements allowing variation of the dimensions of the input aperture (pinhole, slit, etc.) to a spectrograph, and thereby vary the area/volume of a sample over which spectrometric measurements are taken, as well as the resolution of such measurements.

BACKGROUND OF THE INVENTION

A molecular spectrometer is an instrument wherein a solid, liquid, and/or gaseous sample is illuminated, often with non-visible light, such as light in the infrared region of the spectrum. The light reflected from, scattered by, and/or transmitted through the sample is then captured and analyzed to reveal information about the characteristics of the sample. As an example, a sample may be illuminated with infrared light having known intensity across a range of wavelengths, and the light from the specimen can then be captured for comparison to the illuminating light. Review of the captured spectra (i.e., light intensity vs. wavelength data) can illustrate the wavelengths at which the illuminating light was absorbed by the sample, which in turn can yield information about the chemical bonds present in the sample, and thus its composition and other characteristics.

To explain the foregoing arrangement in greater detail, the light from the sample is generally focused onto an input aperture of a spectrograph, a subcomponent of the spectrometer which generates the desired spectral measurements. The spectrograph itself generally includes a monochromator, a device which separates the received light into its component wavelengths, and a photosensitive detector (or detector array) which receives at least some of the light at the component wavelengths and measures the light intensity at these wavelengths. The spectrograph input aperture is usually a slit or hole, with a narrower or smaller aperture size resulting in better differentiation between wavelengths, but at the same time leading to decreased light to the detector and greater noise in intensity measurements. The size of the aperture additionally affects the size of the area or volume of the sample being analyzed, since it is effectively the image of the sample as viewed through the aperture (and ultimately projected onto the detector) which generates the spectral readings. For example, a pinhole (small circular hole) is often used as an aperture for confocal spectrometry arrangements, wherein readings are to be limited to a very specific area on the sample (the focus).

Owing to the tradeoffs involved with selection of an aperture size, it is often desirable to allow a spectrometer user the ability to vary aperture sizes, as by moving opposing masks together (or apart) to allow variation of the width of a slit defined therebetween, or by rotating or translating a mask having differently-sized pinholes or slits thereon to situate an aperture of the desired size and configuration at the entrance of the spectrograph. The problem with these arrangements is that for best results, the aperture must be precisely situated at the focus of the beam carrying the sample image. It is common for arrangements such as rotating/translating masks to eventually fall out of alignment with the focus after extended use, leading to maintenance burdens and/or degraded measurement quality. Further, while reliable variable-width slits can be constructed using the aforementioned opposing respaceable masks, it is difficult to similarly form a resizable pinhole aperture. One could conceivably situate one mask pair immediately adjacent another mask pair, with one mask pair allowing slit size variation in one direction and the other mask pair allowing slit size variation in a perpendicular direction so that the two effectively combine to form a variably-sized "pinhole," but it is difficult to construct a reliable mechanism for doing so without creating an undesirably bulky mask which at least partially obstructs some of the desired light. In other words, it is difficult to construct such an arrangement without having the masks extend for an undesirable distance in front of and behind the focal point of the image beam. It would therefore be useful to have available spectrometry arrangements which allow variation of aperture sizes and/or configurations, while still providing a reliable mechanism for resizing which is resistant to misalignment problems.

SUMMARY OF THE INVENTION

The invention involves spectrometry devices and methods which are intended to at least partially solve the aforementioned problems. To give the reader a basic understanding of some of the advantageous features of the invention, following is a brief summary of a preferred version of the invention, with reference being made to the accompanying drawings to enhance the reader's understanding. Since this is merely a summary, it should be understood that more details regarding this and other versions may be found in the remainder of this document. The claims set forth at the end of this document then define the various versions of the invention in which exclusive rights are secured.

Referring particularly to FIGS. 1A-1B, a spectrometer 100 is depicted, with FIG. 1A presenting a perspective view of selected components and FIG. 1B presenting a top schematic view of these same components. The spectrometer 100 includes a sample mount 102 bearing a sample to be analyzed, and a light source 104 illuminating the sample mount 102, here via the light from the source 104 being collected by a collection lens 106, directed off a mirror 108, and focused by an objective lens 110 onto the sample 102. An image of the sample mount 102 (and more particularly the illuminated sample) is then supplied to a spectrograph 112 (a monochromator 114 coupled with a photosensitive detector 116), with the image being collected by the objective lens 110, directed through the (dichroic) mirror 108 onto an astigmatic optical element 118 (here a lens), and then being received by the monochromator 114. The monochromator 114 is depicted as being of the Czerny-Turner type, including an elongated slit-type input aperture 120, a first collimating reflector 122 supplying the sample image from the input aperture 120 to a diffraction grating 124, and a concave second reflector 126 receiving the rays from the diffracted sample image and directing the rays at each wavelength to a discrete region on a detector 116 (which is depicted as a linear array detector 116, i.e., a series of photosensitive elements adjacently situated in a row). Thus, the detector 116 provides an indication of the intensity of the various wavelengths of light reflected/scattered from the sample 102, and thereby provides an indication of the characteristics of the sample 102.

A useful feature of the foregoing arrangement is that the astigmatic optical element 118 receives the sample image and delivers the image along perpendicular first and second focal planes (tangential and sagittal focal planes) having spaced first and second focal points 128 and 130. This is best depicted in FIGS. 1C-1D, wherein FIG. 1C depicts the rays from a vertical (sagittal) focal plane as solid lines extending from a midplane of the astigmatic optical element 118 to converge at a first focal point 128, and the rays from a horizontal (tangential) focal plane as dashed/phantom lines extending from the astigmatic optical element 118 to converge at a second focal point 130. Similarly, FIG. 1D depicts the rays from the horizontal (tangential) focal plane as solid lines extending from the astigmatic optical element 118 to converge at the second focal point 130, and the rays from the vertical (sagittal) focal plane are shown as dashed/phantom lines converging at the first focal point 128. In all of FIGS. 1A-1D, another elongated slit-type aperture (a first aperture) 132 rests outside of the monochromator input aperture 120 (the second aperture 120), with both of the first and second apertures 132 and 120 being situated in both of the focal planes. Each of the apertures 132 and 120 is situated at least substantially coincident with the focal point of a respective one of the focal planes, and with its length being oriented coincident with this focal plane; in FIGS. 1A-1D, the first aperture 132 is aligned along the horizontal (tangential) focal plane (and is shown in phantom in FIG. 1C), and the second aperture 120 is aligned along the vertical (sagittal) focal plane (and is shown in phantom in FIG. 1D). With the apertures 132 and 120 aligned in the focal planes (as depicted best in FIG. 1A), their slits effectively combine to provide a pinhole-type aperture through which the sample image is provided to the diffraction grating 124 and detector 116 of the spectrometer 100. However, at least one of the apertures 132 and 120 is movable into and out of at least one of the focal planes. This can be done, for example, by adjusting its sides to expand the aperture width and open the aperture to pass the entire image beam (as implied by the arrows depicted in FIGS. 1C-1D), or by translating the entire aperture out of the image beam (as depicted in FIG. 1A, which depicts a series of substitute first apertures 132A, 132B, 132C of different size which may be moved in place of the first aperture 132). If the first aperture 132 is opened or translated out of the image beam, only the second aperture 120 is left in the image beam path (along the second focal plane of the image beam), and an entire slit image of the sample is passed to the spectrometer 100. As a result, a "slice" of the light from the sample 102 is detected rather than a "point" (as from the combined apertures 132 and 120), thereby effectively providing readings from the detector 116 whose measurements are based on a larger area of the sample 102. In effect, one may use one or both of the apertures 132 and 120, and may vary the size of the apertures 132 and 120, to image an area of desired size onto the detector 116 and easily shift between confocal and other imaging modes.

Further advantages, features, and objects of the invention will be apparent from the remainder of this document.

BRIEF DESCRIPTION OF THE DRAWINGS

FIG. 1C illustrates the image beam exiting the (schematically depicted) astigmatic optical element 118 to enter the first and second apertures 132 and 120, wherein the rays of the image beam are depicted in a vertical (sagittal) focal plane as solid lines converging at a first focal point 128, and the rays in a horizontal (tangential) focal plane are depicted as dashed/phantom lines converging at a second focal point 130. Additionally, the size (width) of the second aperture 120 is depicted as being continuously variable by altering the spacing of the opposing masks of the second aperture 120.

FIG. 1D illustrates the image beam exiting the (schematically depicted) astigmatic optical element 118 to enter the first and second apertures 132 and 120, wherein the rays of the image beam are depicted in a horizontal (tangential) focal plane as solid lines converging at a second focal point 130, and the rays in a vertical (sagittal) focal plane are depicted as dashed/phantom lines converging at a first focal point 128. Additionally, the size (width) of the first aperture 132 is depicted as being continuously variable by altering the spacing of the opposing masks of the first aperture 132.

FIG. 2 shows a perspective view of an imaging configuration 200, wherein the image of a sample 202 is reflected from an astigmatic optical element 218 and through first and second apeartures 232 and 220, with the second aperture 220 defining the entrance to a spectrograph 212, before ultimately reaching the detector 216.

DETAILED DESCRIPTION OF PREFERRED VERSIONS OF THE INVENTION

Figures 1A, 1B:
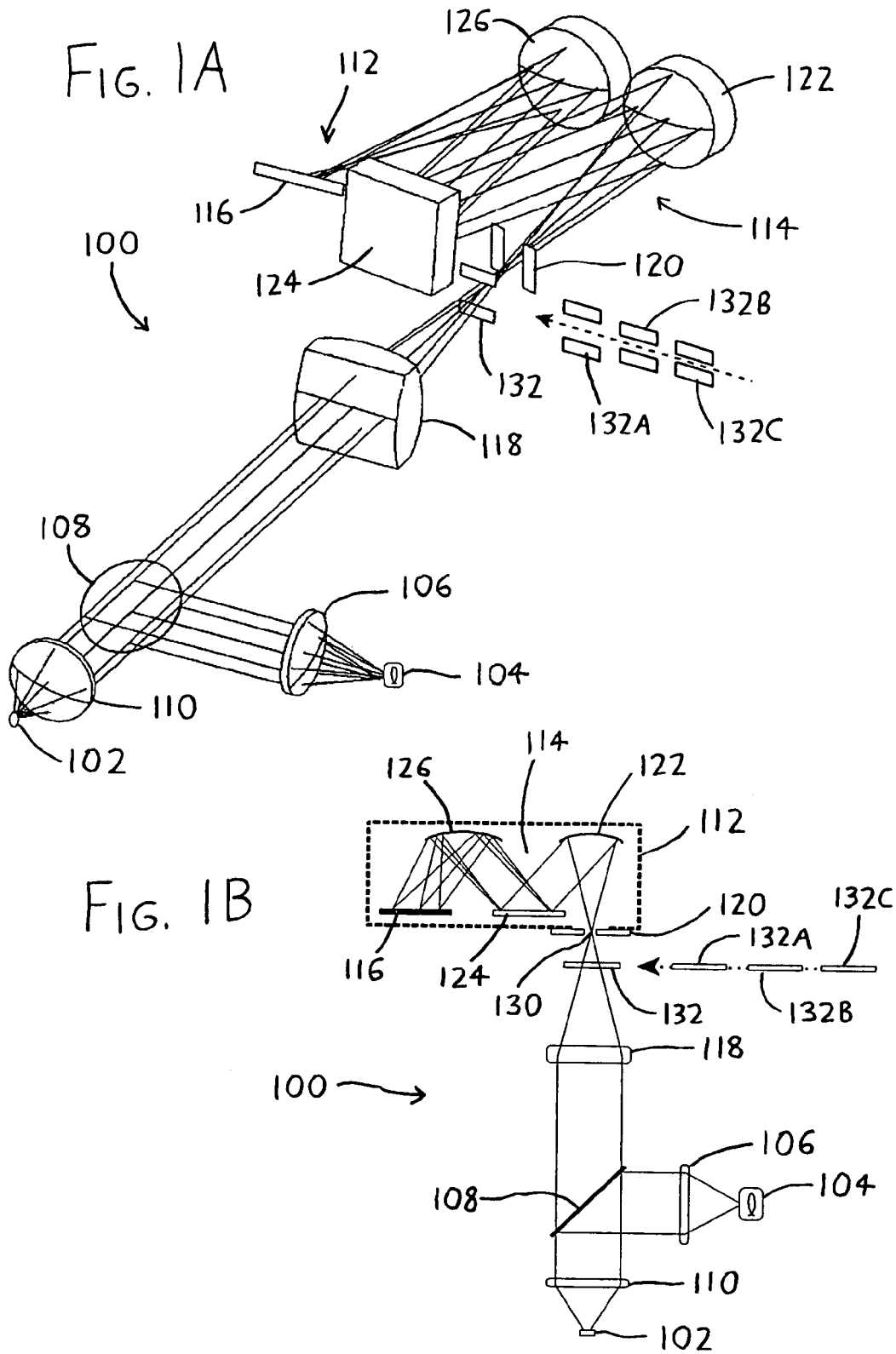
FIG. 1A is a perspective view of selected components of a spectrometer arrangement 100, wherein the image of a sample 102 is directed through an astigmatic optical element 118 (e.g., a toroidal lens), causing the image to be directed along perpendicular focal planes having spaced focal points (better shown in FIGS. 1C-1D), with a pair of slit-type apertures 132 and 120 each being situated at a respective focal point of one of the planes. Additionally, the first aperture 132 is schematically depicted as being replaceable by a series of differently-sized substitute first apertures 132A, 132, and 132C, and the second aperture 120 is depicted as defining the entrance aperture to a spectrograph 112 (which includes a collimating reflector 122, a diffraction grating 124, a second mirror 126, and a photosensitive detector array 116).
FIG. 1B provides a top plan view of the arrangement of FIG. 1A, wherein the spectrograph 112 is more specifically indicated with a phantom/dashed line boundary.

To review the invention in further detail, it should be understood that the invention can be incorporated in any appropriate preexisting spectrometer arrangement. In particular, the astigmatic optical element 118 and the dual apertures 120 and 132 can be readily implemented in preexisting spectrometer arrangements which utilize Czerny-Turner spectrographs with spherical mirrors (e.g., the Oriel MS125 spectrograph provided by Newport Corporation, Stratford, Conn.). Since the configuration of the spectrometer may vary, it should be understood that the components and arrangement of the sample mount 102, light source 104, the optical elements such as the collection lens 106, mirror 108, objective lens 110, etc., and the monochromator 114 and detector 116 may vary widely (and some of these elements may be omitted, may be replaced by functionally similar elements, and/or may be comprised of several individual elements). Additional components may be present as well, with an obvious example being a housing which includes mountings for the components illustrated in the drawings (with no such housing or mountings being shown in the drawings). Additional optical elements are also readily accommodated, e.g., beam-folding mirrors which alter the path of the image so that the overall arrangement of the spectrometer 100 may be made more compact, or may otherwise better fit some desired configuration.

The astigmatic optical element 118 may be any optical element which provides different focal lengths in different planes, and can be a lens (such as the toroidal lens 118 of FIGS. 1A-1B), a reflector, or combinations of lenses and/or reflectors. This is illustrated by the spectrometer 200 of FIG. 2, wherein the image of a sample mount 202 (and more particularly of any sample thereon) is reflected from an astigmatic optical element 218 (depicted as an off-axis spherical mirror) and through first and second apertures 232 and 220, with the second aperture 220 defining the entrance to a spectrograph 212, before ultimately reaching the detector 216. Further, the astigmatic optical element may be formed of combinations of optical elements, e.g., a combination of a cylindrical lens and a spherical lens, a combination of a cylindrical mirror and a spherical mirror, etc. It is notable that the invention is particularly easily implemented in spectrometers which primarily operate at or near infrared wavelengths, and which thereby make extensive use of reflective optical elements rather than refractive optical elements (owing to low transmission of infrared through conventional glass refractive optical elements). Since such spectrometers often utilize off-axis reflectors to achieve beam focusing and other objectives, and such reflectors inherently introduce some degree of astigmatism, the dual-aperture scheme described in this document can often be readily implemented at minimal cost, and with the benefit of substantial added versatility.

The drawings (particularly FIGS. 1A and 1C-1D) illustrate varying the size of the first aperture 132 in a discrete fashion by replacing the first aperture 132 with substitute first apertures 132A, 132B, and 132C having different aperture sizes. In contrast, FIGS. 1C and 1D illustrate continuously varying the sizes of the apertures 132 and 120 by varying the width of their slits (i.e., by varying the spacing between their opposing masks). It should be understood that either or both of these size variation techniques may be implemented in either or both of the first and second apertures 132 and 120.

In practice, the spectrometer 100 may be used with both apertures 132 and 120 installed (and narrowed) to present an effective pinhole aperture for confocal imaging of the sample 102. Alternatively, if a larger area of the sample 102 is to be analyzed, one of the apertures 132 and 120 may be adapted so that it does not interfere with the image beam (i.e., it may be enlarged about the beam or moved from the beam path). As a result, the detector 116 will receive (and generate measurements from) a slit image rather than a pinhole image. If desired, the other aperture may also be adapted as well, as by slightly narrowing or enlarging it, to vary the resolution of the measurements.

In the foregoing arrangement, it is preferred that the second aperture 120 remain as the entrance to the spectrograph 112, and that the first aperture 132 be insertable/removable and/or respaceable outside the spectrograph 112 to avoid interference with the image beam. In this manner, the spectrograph 112 and/or its monochromator 114 may be constructed, installed, and removed for maintenance as a unit, with the second aperture 120 being held in a fixed location with respect to the diffraction grating 124 (as well as with respect to the collimating reflector 122, second reflector 126, and detector 116). This is beneficial since maintaining the second aperture 120 in a substantially fixed location with respect to the spectrograph 112 (in particular the diffraction grating 124) substantially reduces or eliminates many of the misalignment difficulties that arise in prior arrangements wherein the entrance aperture of the spectrograph was repositionable with respect to the remaining spectrograph components.

The invention is not intended to be limited to the preferred versions described above, but rather is intended to be limited only by the claims set out below. Thus, the invention encompasses all different versions that fall literally or equivalently within the scope of these claims.

What is claimed is:

1. A spectrometer comprising:
   a) sample mount;
   b) an objective lens imaging the sample mount;
   c) a single astigmatic lens configured to optically operate with the objective lens so as to deliver the image of the sample mount along first and second focal planes having spaced focal points;
   d) an elongated first aperture situated to receive a first image of the sample mount so as to operate the spectrometer in a confocal configuration, the first aperture being:
      1) oriented along the first focal plane, and
      2) being situated at least substantially coincident with the focal point of the first focal plane,
      wherein the first aperture is further adapted so that it does not operate in the confocal configuration by either moving the aperture away from the focal point of the first focal plane or by adjusting a moveably configured aperture width of the first aperture oriented perpendicular to its aperture length,
   e) an elongated second aperture:
      1) oriented along the second focal plane, and
      2) being situated at least substantially coincident with the focal point of the second focal plane,
      the second aperture receiving a second image of the sample mount;
   f) a monochromator configured to receive a desired image of at least the second aperture.

2. The spectrometer of claim 1 wherein the monochromator includes a linear array detector extending coincidently along the first focal plane.

3. The spectrometer of claim 1 wherein:
   g) the monochromator has a diffraction grating therein, and
   h) the diffraction grating and second aperture are connected whereby they may be removed from the spectrometer as a unit while maintaining a fixed relationship between the diffraction grating and second aperture.

4. The spectrometer of claim 1 wherein the optical element includes an off-axis toroidal reflector.

5. A spectrometric analysis method comprising:
   a) providing an image of a sample mount by utilizing a single astigmatic lens to direct an image to elongated first and second apertures along perpendicular focal planes having spaced focal points so as to operate in a confocal configuration, wherein each aperture is:
      1) situated at the focal point of a respective one of the focal planes, and
      2) oriented with its length along a respective one of the focal planes,
   b) moving the first aperture out of at Least one of the focal planes to provide for a wider field of view so as to not operate in the confocal configuration; and
   c) thereafter repeating step a) with only the second aperture being situated at the focal point of a respective one of the focal planes.

6. The method of claim 5, wherein the step of moving the first aperture out of the at Least one of the focal planes further comprises the step of enlarging the first aperture.

7. The method of claim 5:
   d) wherein a photosensitive detector receives at least a portion of the image of at least one of the first and second apertures;
   e) further comprising the step of obtaining a reading of light intensity from the detector.

8. The method of claim 7 further comprising a monochromator interposed between the detector and at least one of the first and second apertures.

* * * * *